(12) United States Patent
Henocq et al.

(10) Patent No.: US 8,135,065 B2
(45) Date of Patent: Mar. 13, 2012

(54) METHOD AND DEVICE FOR DECODING A SCALABLE VIDEO STREAM

(75) Inventors: Xavier Henocq, Mouaze (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 1460 days.

(21) Appl. No.: 11/564,596

(22) Filed: Nov. 29, 2006

(65) Prior Publication Data

US 2007/0127576 A1 Jun. 7, 2007

(30) Foreign Application Priority Data

Dec. 7, 2005 (FR) ..................................... 05 12434

(51) Int. Cl.
*H04B 1/66* (2006.01)

(52) U.S. Cl. ......... 375/240.16; 375/240.25; 375/240.26; 375/240.15; 375/240.14; 375/240.12; 382/233; 382/235; 382/240; 382/238; 382/236

(58) Field of Classification Search ............ 375/240.16, 375/240.25, 240.26, 240.15, 240.14, 240.12; 382/233, 235, 240, 238, 236

See application file for complete search history.

(56) References Cited

U.S. PATENT DOCUMENTS

| | | | | |
|---|---|---|---|---|
| 5,724,446 | A | 3/1998 | Liu et al. | 382/233 |
| 2002/0150164 | A1 * | 10/2002 | Felts et al. | 375/240.19 |
| 2002/0172284 | A1 * | 11/2002 | Peng et al. | 375/240.15 |
| 2005/0069212 | A1 * | 3/2005 | Bottreau et al. | 382/240 |

OTHER PUBLICATIONS

J. Reichel et al., "Joint Scalable Video Model JSVM-3", Joint Video Team (JVT) of ISO/IEC MPEG & ITU-T VCEG (ISO/IEC JTC1/SC29/WG11 and ITU-T SG16 Q6), pp. 1-39, Jul. 29, 2005.

Jenq-Neng Hwang et al., "Motion Vector Re-Estimation and Dynamic Frame-Skipping for Video Transcoding", Signals, Systems & Computers, vol. 2, pp. 1606-1610, Nov. 1, 1998.

G. Sullivan et al., "Text of ISO/IEC 14496-10 Advanced Video Coding $3^{rd}$ Edition", Joint Video Team (JVT) of ISO/IEC MPEG & TTU-T VCEG (ISO/IEC JTC1/SC29/WG11 and ITU-T SG16 Q.6), pp. 1-314, Jul. 2004.

* cited by examiner

*Primary Examiner* — Shawn An
(74) *Attorney, Agent, or Firm* — Fitzpatrick, Cella, Harper & Scinto

(57) ABSTRACT

For decoding a scalable video stream, in which the images may be decoded by groups of several images, each group being constituted by at least three levels of image temporal hierarchy, the images of the lowest level having the lowest time frequency and the images of each following level having a time frequency at least twice that of the images of the preceding level, a temporal hierarchy level being formed by at least one predetermined time interval, a time interval separating two images in that temporal hierarchy level: during the decoding of at least one temporal hierarchy level, at least one item of information is obtained representing a parameter relative to the content of the video stream over at least one time interval, and an order in the decoding of the images of each group of images is defined as a function of said information obtained.

25 Claims, 12 Drawing Sheets

$$h[k] = s[2k+1] - P(s[2k]) \quad (2.1)$$

$$P_{5/3}(s[x,2k]) = \tfrac{1}{2} \cdot s[x+m_1, 2k] + \tfrac{1}{2} \cdot s[x+m_2, 2k+2] \quad (2.2)$$

$$l[k] = s[2k] + U(h[k]) \quad (2.3)$$

$$U_{5/3}(h[x,k]) = \tfrac{1}{4} \cdot h[x+m_1, k] + \tfrac{1}{4} \cdot h[x+m_2, k-1] \quad (2.4)$$

METHOD AND DEVICE FOR DECODING A SCALABLE VIDEO STREAM

The present invention relates to a method and a device for decoding a scalable video stream.

It belongs to the field of video transmission over a network.

The development of mobile and fixed communication networks should enable numerous video transmission applications to appear. These applications are envisaged for a great diversity of receiving units ranging from the PC to the mobile telephone, to electronic diaries, to the television, etc. It will be possible to use wired and wireless networks with heterogeneous capacities. It will be possible for the same video stream to be transmitted to that group which is heterogeneous both in terms of receiver and in terms of network.

A video format called SVC (Scalable Video Coding), currently in course of standardization, will be particularly adapted to this type of environment. This format, in which the size of the video stream may be finely adjusted, will be constituted by several versions of the same video stream overlapping in the same bitstream. It will be possible to transmit a sub-set of that bitstream to a receiver in order for that sub-set to be adapted to the calculation capacities of the receiver.

However, despite this adaptation, it will occur that, under transitory conditions, a bitstream will no longer be adapted to the calculation capacities of the receiver. The invention has a vocation to be applied to such a situation, i.e. in which the bitstream is no longer adapted to the calculation capacities of the receiver.

Thus, by way of an example that is in no way limiting, the invention concerns domestic applications of transmission from a sender to a receiver. The sending and receiving units will be potentially mobile embedded systems. The sending unit will have storage capacities which will enable it to store videos after their acquisition and their compression and real-time coding capacities.

A user will be able to request the viewing of videos on a viewing receiving unit. For this, a connection will be created between the sender and the receiver. A first exchange of items of information between the sender and the receiver will enable the sender to know the nature of the receiver, its capacities and the wishes of the user. It will be possible for these first items of information to describe the receiver in terms of overall calculation capacity, display capacity and decoding capacity. Other items of information will be exchanged during the transmission.

By contrast to items of information transmitted on initialization, these items of information will be updated regularly. They will describe the evolution of the capacities of the receiver both in terms of reception and in terms of real calculation capacity. It will be possible for the analysis of these items of information to incite the sender to adapt the video.

The adaptation of the video is only efficacious in case of a steady state. It does not enable periods of transition between two states to be dealt with. When for example the calculation capacities decrease, there is a risk of losses occurring so long as the sender has not been alerted of the change.

The invention aims to reduce the visual impact of such transitory drops in the calculation capacities of the receiver and more particularly, when the video is compressed in SVC format.

A rapid description is given below of the SVC standard, which is defined in part 10, amendment 1 of the MPEG-4 standard. For a more in-depth description, reference may usefully be made to the document by J. REUCHEL, H. SCHWARTZ and M. WIEN entitled "*Joint Scalable Video Model JSVM-3*", Poznan, July 2005, available for example on the Internet at the following address: http://ftp3.itu.int/av-arch/jvt-site/2005_07_Poznan/JVT-P202r1.zip. As from a few months ago, the SVC standard has been treated as an extension of the H264 standard, of which a description may be found in the document by G. SULLIVAN, T. WIEGAND, D. MARPE and A. LUTHRA entitled "*Text of ISO/IEC 14496-10 Advanced Video Coding*", $3^{rd}$ edition. The SVC standard completes the H264 standard by introducing spatial, temporal and quality scalability tools. These scalability levels will be overlapped in the same stream, the basic level being in general compatible with the H264 standard.

Two technologies are envisaged for the coding of the SVC streams, each technology using blocks of pixels as basic units for coding: open-loop coding and closed-loop coding.

The technique of open-loop coding is based on Motion Compensated Temporal Filtering or MCTF.

Coding in open loop means that it is the images of the original sequence that are used as references for the motion prediction in the coder. This technique is illustrated in the flowchart of FIG. 1.

It commences at step S100 with the creation of a group of successive images (Group Of Pictures, GOP). These groups may be of variable sizes. This step is followed by the step S101 during which a motion estimation is carried out. This is followed by motion compensated temporal filtering (steps S103, S105) based on a lifting scheme illustrated in FIG. 2.

This filtering commences with a polyphase transform represented by steps S201, S203*a* and S203*b*. These steps separate the even $S_{2k}$ and odd $S_{2k+1}$ samples (pixels). These steps are followed by the step S205 which consists of carrying out the prediction of the even samples by the odd samples. This prediction is represented by the equation (2.2), in which s[x, k] is the sample at the spatial position x in the image k of the GOP and $m_1$ and $m_2$ are the motion vectors obtained during the motion estimation step S101 of FIG. 1. Step S205 is followed by step S207 during which the prediction of the odd sample is subtracted from the value of that sample (equation (2.1), in which P designates the prediction). Note that the samples coming from that step are high frequency samples. Step S207 is followed by step S209 during which updating of the even samples is carried out. For this, equation (2.4) is applied to the high frequency samples coming from step S207. The result is added to the even samples at step S211 (equation (2.3)). Note that the samples obtained at step S211 are low frequency samples.

With reference to FIG. 1, the SVC coding continues with step S107 during which a spatial transformation of the integer Discrete Cosine Transform (DCT) type is applied to the high frequency images. This step is followed by the step S109 which consists of testing the number of low frequency images remaining.

If this number is different from 1, step S101 is returned to in order to process the remaining low frequency images. This step is followed by the steps S103, S105 and S107 described earlier. If only one low frequency image remains, the spatial transform is applied to all the remaining images (low and high frequency) and the coding ends at step S111 before passing on to the following GOP.

It is to be noted that in open-loop coding, the decoder will not have the same reference images as the coder during the motion compensation.

The technique of closed-loop coding is illustrated in the flowchart of FIG. 3. In video, the term closed-loop coding is used for a coding system in which the images used as references for the motion prediction are images that are coded and decoded. Thus, it will be possible for the decoder to have the same reference as the coder. Closed-loop coding of the SVC standard uses a transformation of the GOP into so-called B-hierarchical images, well known to the person skilled in the art.

As FIG. 3 shows, commencement is made by creating a GOP of $N=2^{n-1}$ images (step S301). This step is followed by the step S303 consisting of classifying the images into n hierarchical levels. During this step, the first image of the GOP is allocated to hierarchical level 1. The hierarchy is then climbed by multiplying the time frequency of images (i.e. the number of images per time interval) by two at each hierarchical level, each image of a hierarchical level x being at equal distance from the two images closest to the level x−1.

Step S303 is followed by step S305 during which an integer variable k is initialized to the value 1. Next it is verified that k has not reached the number of hierarchical levels n (test S307). If that is not the case, the motion estimation/motion compensation is carried out for each image of the level k (step S309). When k=1, the second image of the level is predicted from the first image of that level. When k is greater than 1, each image of the level is predicted from the two images bounding it taken from the level k−1. Step S309 is followed by step S311 which consists of performing the calculation of the residue (difference between the original image and its prediction), then step S313 which consists of applying a spatial transformation of DCT type to each block of pixels of the residual image. This step is followed by the step S315 which consists of incrementing k by 1.

Step S307 is followed by end step S317 if k reaches n. Indeed, the coding algorithm stops at this step and passes on to the coding of the following GOP.

The SVC standard has been defined to code a video stream in the form of several hierarchical levels. In general, the base level of the SVC stream is coded in closed loop in order to remain compatible with the H264 standard. As regards refinement levels, these are either coded in open loop, or are coded in closed loop like the base level. The refinement levels may increase the time frequency, the spatial resolution and the quality of the base levels. The quality refinement levels are not of concern here.

In order to increase performance with respect to compression, the SVC standard provides for predicting a spatial hierarchical level k from a spatial level of lower hierarchy. It will thus be possible to predict the texture and motion of a level k from information from a lower level. The terms inter-layer texture prediction and inter-layer motion prediction are used.

In order to increase the gain in compression, a recent contribution to the standard has proposed a scheme enabling inter-layer prediction when the levels have different time frequencies. Indeed, in this case, it is possible for the images of a hierarchical level k not to have a corresponding image having the same time reference in the lower levels. When this is the case, a virtual image is created on the basis of the images present in the lower level. The images of the level k not having a corresponding image are then predicted on the basis of the virtual images.

FIGS. 4 and 5 represent two SVC streams constituted by two levels of spatio-temporal hierarchy. In both cases, the base level is coded with B-hierarchical images (denoted "B" in FIGS. 4 and 5). The refinement level doubles the spatial resolution and the time frequency. In FIG. 4, the refinement level is coded in open loop with motion compensated temporal filtering (MCTF) with updating step. Incidentally, it may be recalled that three types of video images are defined by the MPEG standard: intra images (I type), not having any reference in a preceding or following image; images obtained by forwards prediction (P type), coded with respect to a preceding reference image; and bi-predicted images (B type), coded with respect to a preceding reference image and a following reference image.

In FIG. 4, the images L3, H3, H2, H1 and H0 as well as the images Bx (x=1, 2, 3) are images coded in the SVC bitstream. The images L0, L1 and L2 are generated during the coding but are not kept in the final bitstream. FIG. 5 represents a refinement level coded with B-hierarchical images. The images E1 to E17 and I, P, B1, B2 and B3 are all kept in the final bitstream. The virtual images are illustrated in dashed line and are not coded.

In the two Figures, the arrows represent the direction of prediction. For example, in FIG. 4, image 1 is predicted from images 2, 3 and 4. Image 6 is updated by virtue of images 1, 2 and 5. Image B1 is predicted from images I and P, etc.

Few studies exist concerning the mechanisms for rejection of images in case of overload of a calculation unit during a decoding operation. The reason for this is that in the case of earlier video standards, the decoder scarcely had the choice of the decoding order. This is because the decoding order was generally defined according to the inter-image dependencies and could not vary. It was possible to reject the images according to their type (I, P or B) but rarely according their content. This was because sufficient information was not available to describe that content without performing prior decoding of the images.

In the current implementation of the decoder, on decoding of a scalability level, except as regards the quality scalability levels, the decoder decodes in increasing order of the temporal scalability levels, then, within each temporal level, it decodes the images in their order of display.

FIG. 6 represents the decoding of a spatio-temporal scalability level coded with MCTF, i.e. with open-loop coding. FIG. 7 represents the decoding of a spatio-temporal scalability level coded with B-hierarchical images. In FIGS. 6 and 7, the order of the decoding is indicated by the substantially horizontal arrows constituted by dashes. In case of overloading of the calculation unit of the receiver, the latter nevertheless manages to ensure decoding in real time, but by not decoding all the images of a GOP.

Document U.S. Pat. No. 5,724,446 proposes a particular implementation of a video decoder. During the decoding, the decoder creates an image memory. Before the decoding of an image, that decoder initializes the image memory with the values of pixels of the preceding image. A descriptor is calculated for each macroblock (designated in all that follows by the abbreviation MB) of each image. Before decoding a MB, the decoder compares the value of the descriptor of the MB to decode with that of the co-located MB in the preceding image. If the descriptors are similar, the decoder will not decode the current MB and will keep the initialization value. Otherwise, it will decode the MB. This makes it possible to reduce the cost of a complete decoding of a sequence to a minimum. However, when the maximum reduction is reached, this method does not make it possible to set a decoding order for the images taking into account their content. It does not therefore prevent the systematic rejection of certain groups of images.

The drawback of the current decoding order of an SVC video stream is that in case of overload of the receiver's calculation unit, it is automatically the last images of a GOP that are rejected. However, the systematic rejection of these images is unjustified since it does not take into account their information content. In other words, a higher quality of display could be obtained by rejecting other images in the GOP.

The invention aims to remedy this drawback, by setting an order for decoding of the images taking into account their content.

To that end, the present invention provides a method of decoding a scalable video stream, in which the images may be decoded by groups of several images, each group being constituted by at least three levels of image temporal hierarchy, the images of the lowest level having the lowest time frequency and the images of each following level having a time frequency at least twice that of the images of the preceding level, a temporal hierarchy level being formed by at least one predetermined time interval, a time interval separating two images in that temporal hierarchy level, this method being remarkable in that:

during the decoding of at least one temporal hierarchy level, at least one item of information is obtained representing a parameter relative to the content of the video stream over at least one time interval, and an order in the decoding of the images of each group of images is defined as a function of the information obtained.

Thus, the present invention makes it possible to avoid systematically rejecting a specific group of images in case of overload of the receiver's calculation unit, since the decoding order takes into account the content of the images.

The invention thus makes it possible to improve the display quality of the images of a video stream.

Furthermore, the method provided implies no additional cost in terms of complexity of calculation during the decoding and no additional cost in terms of memory space, with respect to conventional decoding.

In a particular embodiment, the aforementioned information represents the motion in the images of the video stream over the aforementioned time interval of the aforementioned temporal hierarchy level.

It will be possible to decide for example to set a decoding order giving preference to the most active parts of a Group of Pictures (GOP), that is to say where there is the most motion. The images that may possibly be rejected will thus be the least interesting in terms of motion.

Thus, in a particular embodiment, the images are decoded in decreasing order of the value of the information representing the motion.

In a particular embodiment, the aforementioned information is the sum of the norm of all the motion vectors of an image relative to a given time interval.

This quantity is economical in terms of memory space used during its storage.

In a particular embodiment, in which an image is constituted by a plurality of macroblocks, if a macroblock does not have a motion vector, a motion vector of maximum amplitude is allocated to that macroblock.

Thus, all the macroblocks participate in the calculation of the information representing the motion, which makes it possible to easily compare the activity, in terms of motion, of all the images of the video stream.

In a particular embodiment, in which an image is constituted by a plurality of macroblocks, if a macroblock is predicted from the image having the same temporal reference in a lower spatial scalability level, that macroblock is attributed with the motion vector associated with the reference macroblock in the image of the same temporal reference of the lower spatial scalability level.

As previously, this makes it possible to take into account all the macroblocks in the calculation of the information representing the motion, which makes it possible to easily compare the activity, in terms of motion, of all the images of the video stream.

In a particular embodiment, in which an image is constituted by a plurality of macroblocks, if a macroblock has two motion vectors because it is predicted from a preceding image and a following image, the motion vectors serving for the prediction of the preceding image towards the current image enter into the calculation of the norm representing the motion in the time interval between the preceding image and the current image, and the motion vectors serving for the prediction of the following image towards the current image enter into the calculation of the norm representing the motion in the time interval between the current image and the following image.

As previously, this makes it possible to take into account all the macroblocks in the calculation of the information representing the motion, which makes it possible to easily compare the activity, in terms of motion, of all the images of the video stream.

According to a particular feature, storage is made in a table of size $2^{n-1}$, where n is a strictly positive integer, of all the sums of the norms of the motion vectors relative to a given time interval in the temporal hierarchy level n.

In a particular embodiment, the video stream is coded in the SVC format.

With the same object as that indicated earlier, the present invention also provides a device for decoding a scalable video stream, in which the images may be decoded by groups of several images, each group being constituted by at least three levels of image temporal hierarchy, the images of the lowest level having the lowest time frequency and the images of each following level having a time frequency at least twice that of the images of the preceding level, a temporal hierarchy level being formed by at least one predetermined time interval, a time interval separating two images in that temporal hierarchy level, this device being remarkable in that it comprises:

means for obtaining, during the decoding of at least one temporal hierarchy level, at least one item of information representing a parameter relative to the content of the video stream over at least one time interval, and means for defining an order in the decoding of the images of each group of images as a function of the information obtained.

The present invention also concerns an information storage means which can be read by a computer or a microprocessor storing instructions of a computer program, making it possible to implement a method as above.

The present invention also concerns a partially or totally removable information storage means which can be read by a computer or a microprocessor storing instructions of a computer program, making it possible to implement a method as above.

The present invention also concerns a computer program product able to be loaded into a programmable apparatus, comprising sequences of instructions for implementing a method as above, when that program is loaded and executed by the programmable apparatus.

As the particular features and advantages of the device, of the storage means and of the computer program product are similar to those of the method, they are not repeated here.

Other aspects and advantages of the invention will emerge from a reading of the following detailed description of a particular embodiment, given by way of non-limiting example. The description refers to the accompanying drawings, in which:

FIG. 1, already described, is a flow chart illustrating the main steps of an open-loop coding scheme that is known per se;

FIG. 2, already described, is a diagrammatic representation of the step of motion compensated temporal filtering included in the coding scheme of FIG. 1;

FIG. 3, already described, is a flow chart illustrating the main steps of a closed-loop coding scheme that is known per se;

FIG. 4, already described, is a diagrammatic representation of an example of open-loop coding of a video stream according to the SVC standard, known per se;

FIG. 5, already described, is a diagrammatic representation of an example of closed-loop coding of a video stream according to the SVC standard, known per se;

FIG. 6, already described, is a diagrammatic representation of the decoding order of an SVC video stream in accordance with the prior art in the case of open-loop coding such as that of FIG. 4;

FIG. 7, already described, is a diagrammatic representation of the decoding order of an SVC video stream in accordance with the prior art in the case of closed-loop coding such as that of FIG. 5;

Figure 8:
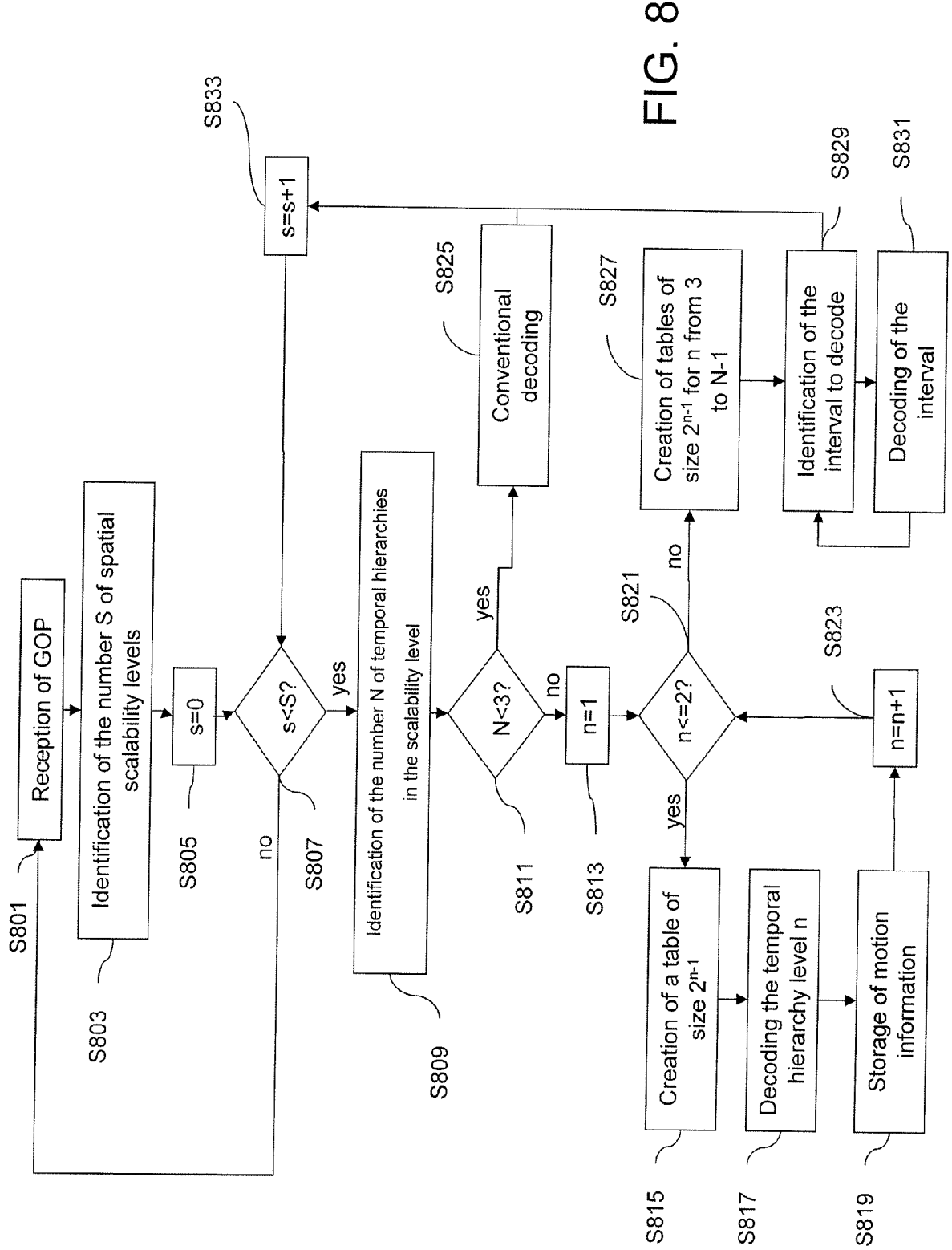
FIG. 8 is a flow chart illustrating the main steps of a method of decoding a video stream according to the present invention, in a particular embodiment.

With reference to FIG. 8, in a particular embodiment, the decoding method in accordance with the invention commences at step S801 by the reception of a GOP. Next during step S803 the number of spatial scalability levels S is identified. S is an integer value greater than or equal to 1. This step is followed by the step S805, which consists of initializing an integer variable s with the value 0. This variable makes it possible to go through all the spatial scalability levels.

Figure 1:
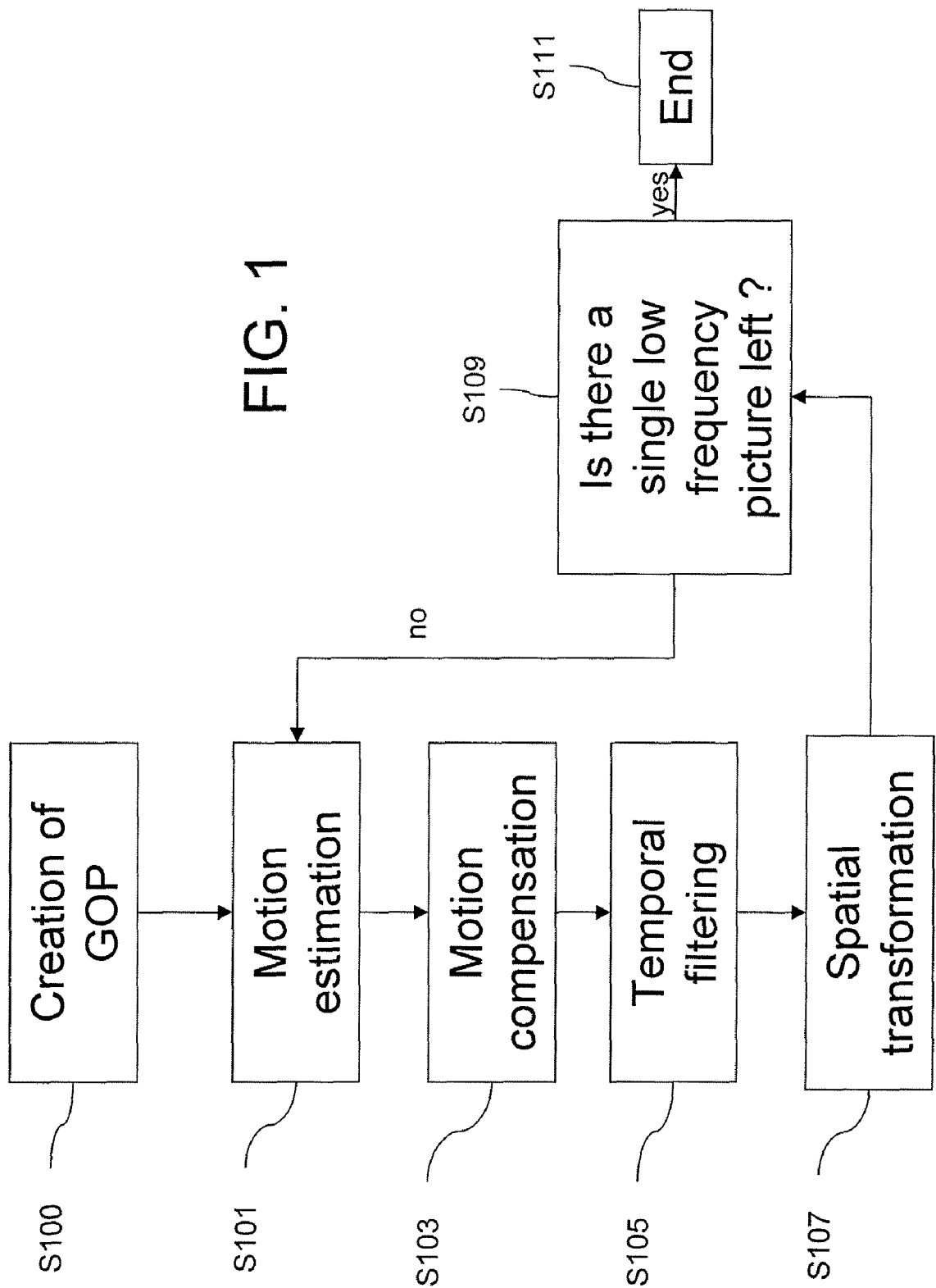
Figure 2:
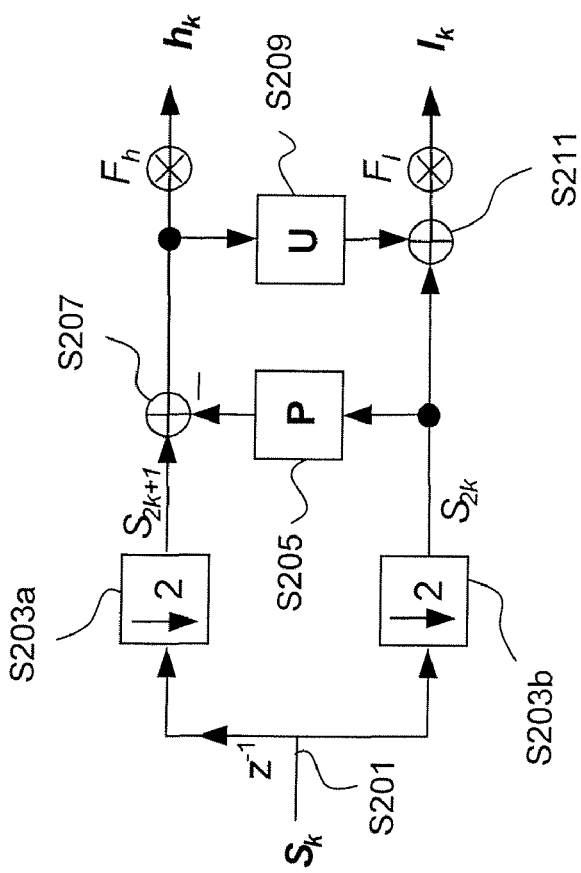
Figure 3:
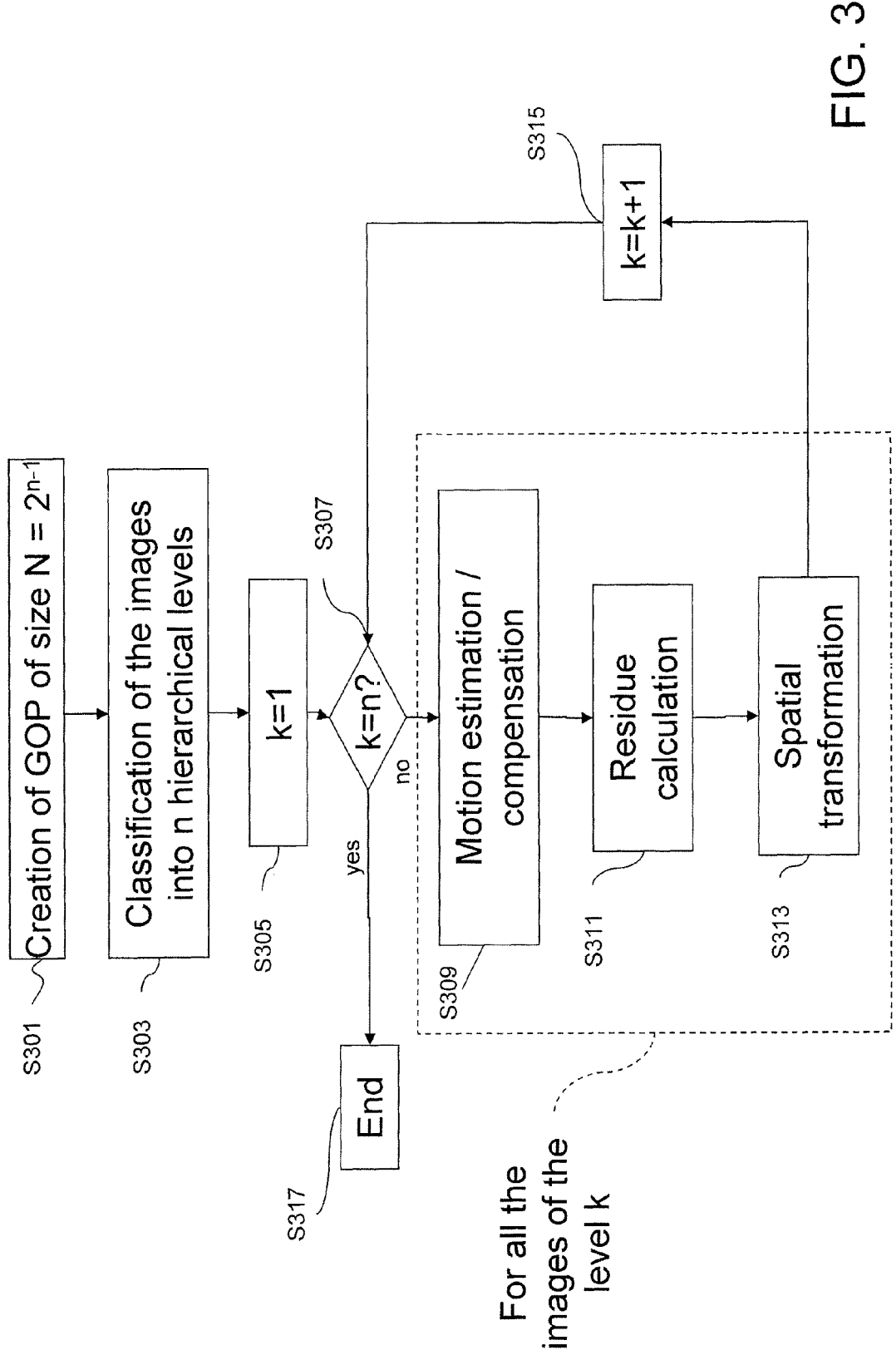
Figure 4:
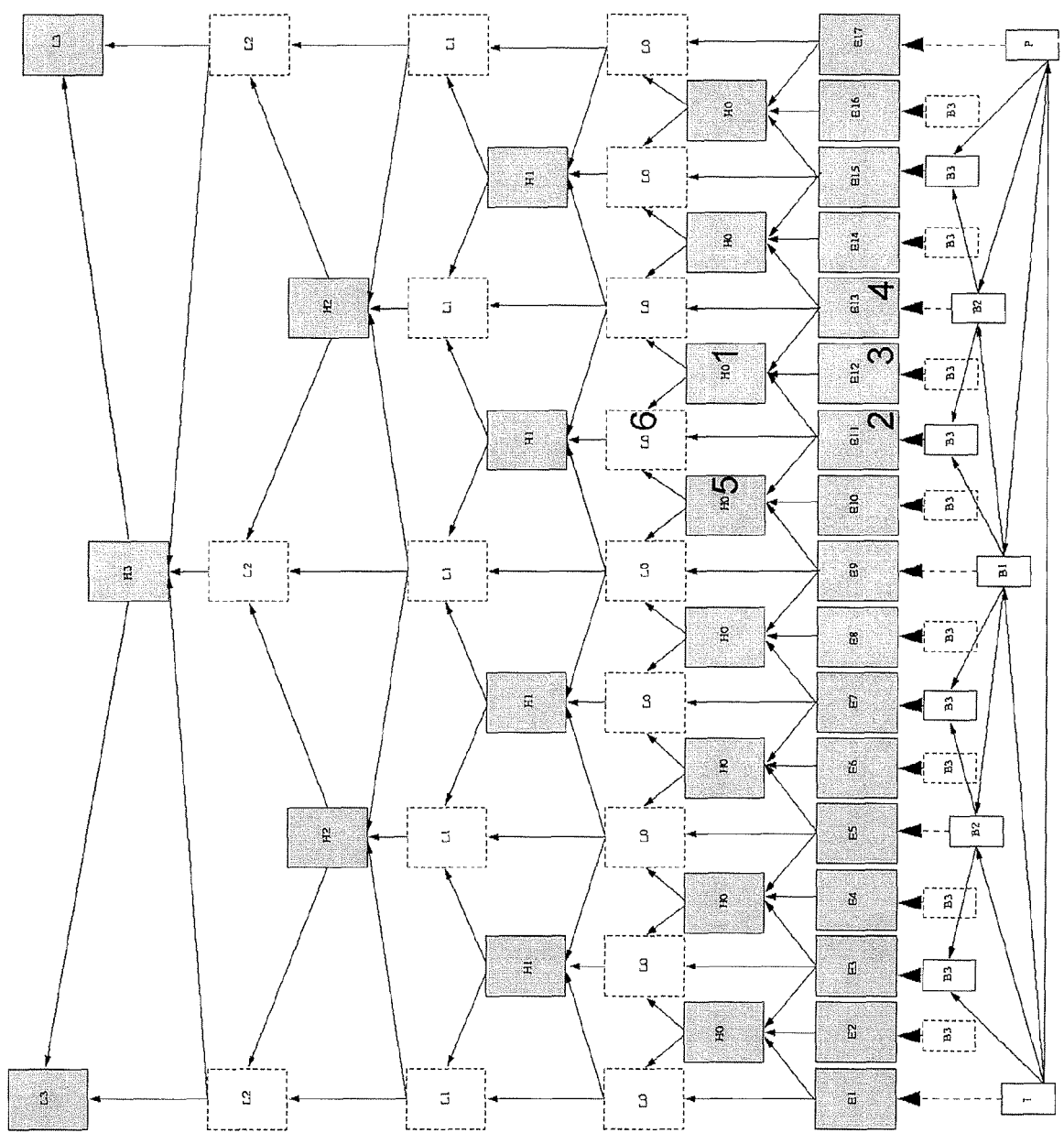
Figure 5:
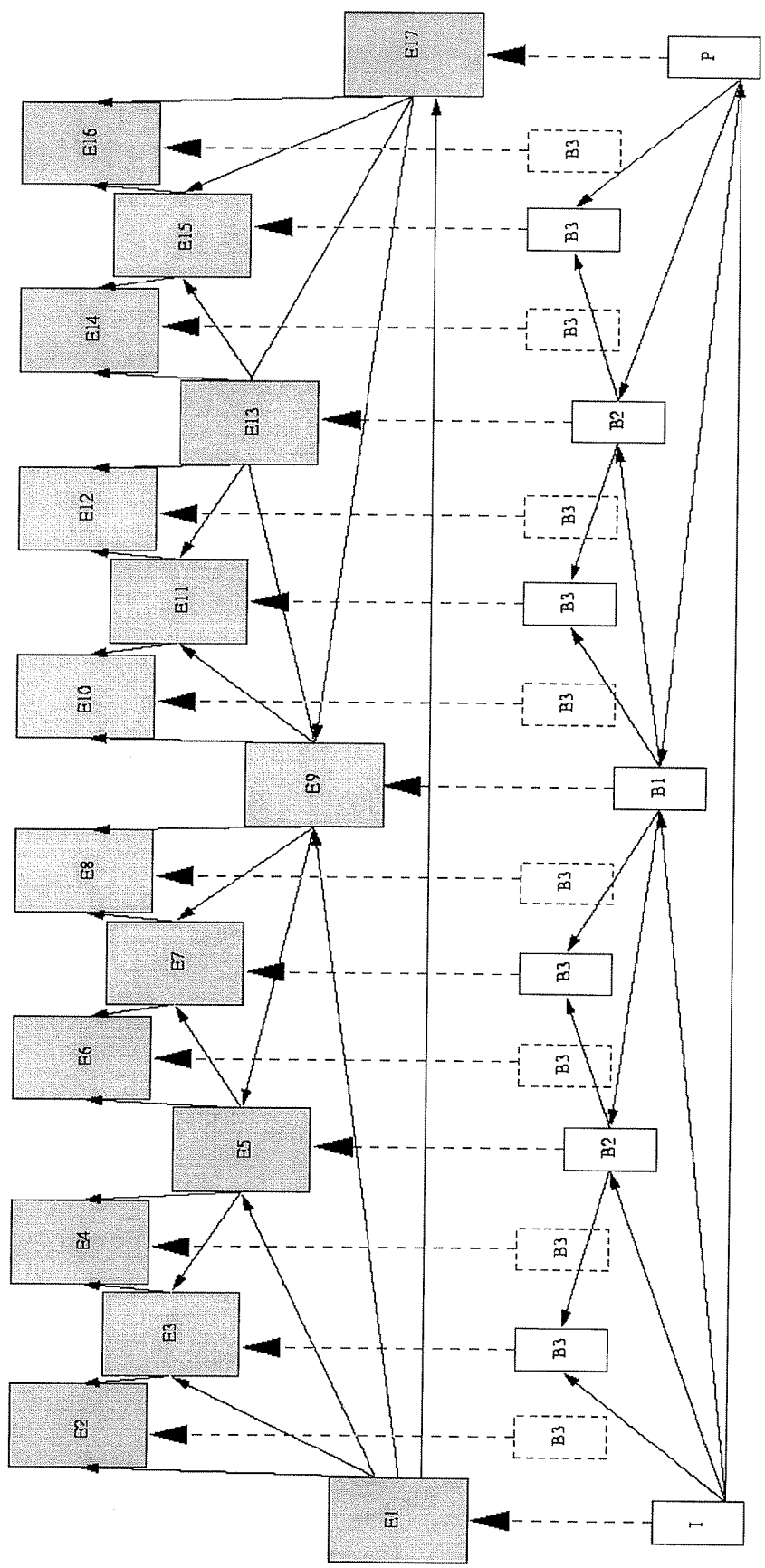
Figure 6:
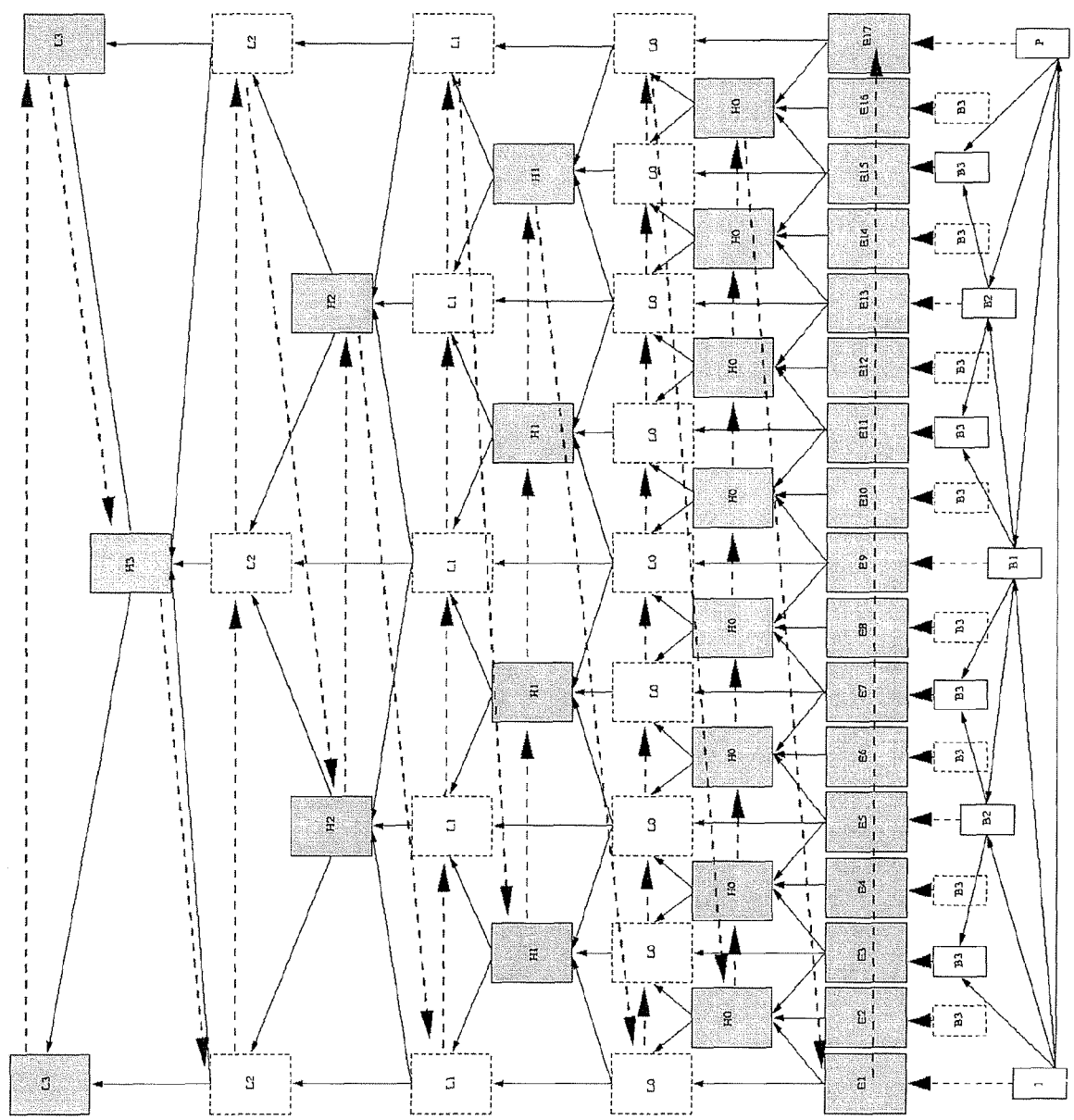
Figure 7:
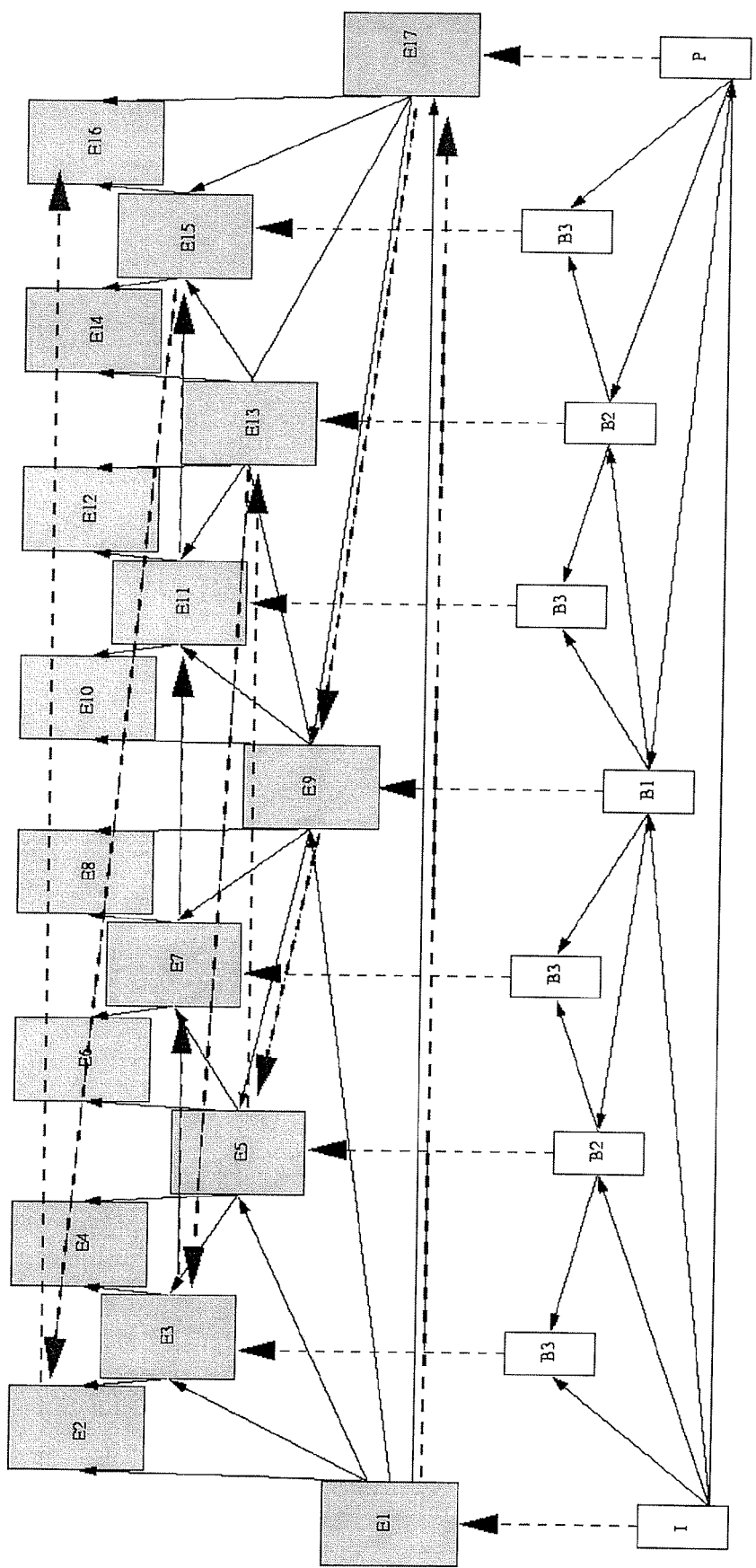

Next step S807 is proceeded to, during which it is tested whether all the spatial scalability levels have been decoded. If this is the case, step S801 is returned to in order to receive a new GOP. Otherwise, step S809 is proceeded to, which consists of identifying the number N of temporal hierarchies in the spatial scalability level s. Step S809 is followed by step S811, during which the value of N is tested. If the latter is less than 3, a conventional decoding operation is performed of the type of the one illustrated in FIG. 6 or FIG. 7.

Otherwise, step S813 is proceeded to, during which an integer variable n is initialized to the value 1. This step is followed by the step S821 which consists of testing whether n is less than or equal to 2. If that is the case, this step is followed by the step S815 which consists of creating in memory a table $TAB_n$ of size $2^{n-1}$. Each element $TAB_n^k$ of the table $TAB_n$ will receive a value representing the motion in the time interval k of the temporal hierarchy level n.

This step is followed by the step S817, during which the decoding of the temporal hierarchy level n is carried out. During this decoding, the motion vectors of each MB of each decoded image are collected. During the following step S819, for each inter-image interval k of the level n, storage is made of information representing the motion between the two images forming the interval, one of these images being a reference image and the other a predicted image. In the preferred embodiment of the invention, this information may be the sum of the norm of all the motion vectors of the predicted image.

The following particular features of the decoding method in accordance with the invention will furthermore be noted.

On the one hand, a predicted image may contain MBs predicted from images of the same spatial scalability level (such as MBs of B type), MBs predicted from the image having the same temporal reference in the preceding spatial scalability level and intra MBs, i.e. non-predicted MBs. An intra MB does not have motion vectors, which does not mean that the motion was zero, but that no similar MB had been found in the reference image. An intra MB will thus be given a motion vector of maximum amplitude in the search window used by the block matching algorithm. The MBs predicted from the lower level use the motion information of a MB of the image with the same temporal reference from the lower level. The value of the motion vector of the MBs of the lower level will be attributed to the MBs using them as references in the upper level.

On the other hand, the SVC standard uses so-called bi-predicted images, that is to say that a MB may also be predicted from a preceding image and from a following image. A MB may thus have two motion vectors. The vectors serving for the prediction from the preceding image to the current image (this type of prediction is termed forward prediction) will be taken into account in the norm representing the motion in that time interval. The vectors serving for the prediction from the following image to the current image (backward prediction) will be taken into account in the norm representing the motion in that second time interval. If a MB only has one motion vector (in the case of a forward or backward prediction) or has none (the case of an intra MB), this indicates that no similar MB has been found in at least one of the reference images. The maximum motion amplitude will then be attributed to the missing vector(s).

Step S819 is followed by step S823 which consists of incrementing n by 1. Next, step S821, already described, is returned to. If, during this step, n is greater than 2, the process is continued by step S827, which consists of creating tables of size $2^{n-1}$ for n from 3 to N−1 with an increment of 1. These tables are created in similar manner to the tables created at step S815 described above.

Step S827 is followed by step S829 during which the identification of the time interval to decode is made. For this, all the elements $TAB_n^k$ present in memory are gone through, searching for the one having the maximum value. The indices n and k indicate the level and following interval to decode. As soon as an interval has been processed, the value of $TAB_n^k$ which it represented is erased from memory. This, in accordance with the present invention, the groups of images are decoded in decreasing order of the value representing the motion within the images.

Step S829 is followed by step S831 which consists of carrying out the decoding of the images of the interval which have not yet been decoded. It should be noted that the decoding of an interval may lead to the decoding of an image not belonging to that interval, but on which at least one image of the interval depends. The references of the images used for the prediction of a current image are written in the slice headers as described in section G.7.3.3.1 of the working document by J. REICHEL, H. SCHWARTZ and M. WIEN entitled "*Draft of Scalable Video coding—Working draft* 4", Nice, October 2005 and available on the Internet at the following address: http://ftp3.itu.int/av-arch/jvt-site/2005_10_Nice/JVT-Q202d1.zip. It is to be recalled that a slice is a group of MBs of an image grouped together behind a header and decodable independently of the other MBs of the image. An image may contain several slices. A possible solution thus consists of decoding the headers of the slices of each image of the interval.

Figure 9:
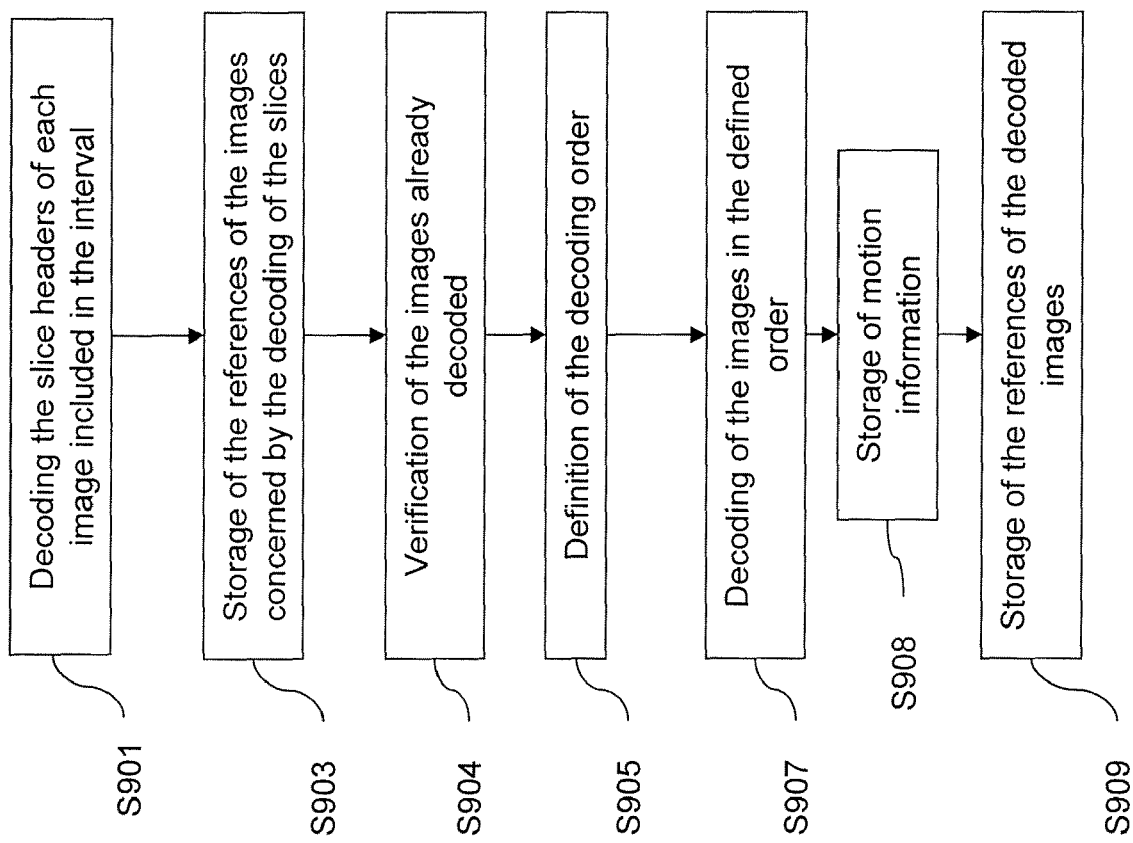
FIG. 9 is a flow chart illustrating in more detail the step S831 of decoding the images of a time interval, illustrated in FIG. 8.

The flow chart of FIG. 9 details step S831 of decoding an interval.

The latter commences with a step S901 consisting of decoding the headers of each slice of each image included in the interval.

The following step S903 consists of carrying out the storage of the references of the images concerned by the decoding of the interval, whether those images be included in the interval or whether they be external to the interval.

At the following step S904, the images already decoded are eliminated from the list of the images concerned by the interval.

In accordance with the invention, the following step S905 consists of defining a decoding order by taking into account the inter-image dependencies. Thus, the time intervals are considered in an order deduced from the motion information, then, in a first phase, the images necessary for the decoding of the images of the interval considered are decoded, before decoding the images of the interval in their display order.

This step is followed by the actual decoding of all the images concerned by the interval (step S907), then, the storage of the motion information in the elements $TAB_n^k$ of the table $TAB_n$ (step S908) and the storage of the references of the images already decoded (step S909).

As soon as an interval has been decoded, the following interval to decode is sought (step S829 of FIG. 8). If there is no further interval to process, step S829 is followed by step S833 which consists of incrementing the variable s by 1. Step S807, already described, is next returned to.

Figure 10:
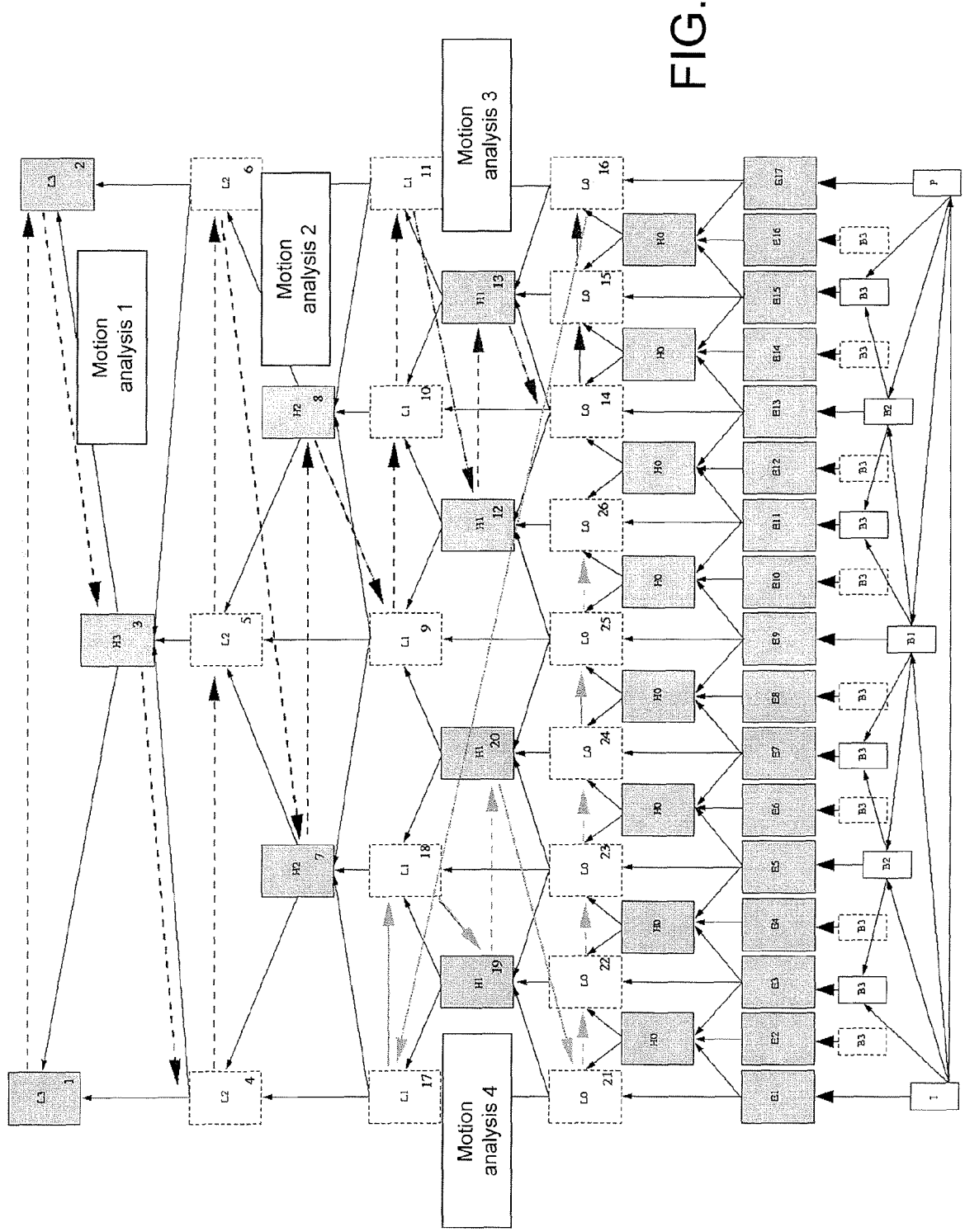
FIG. 10 is a diagrammatic representation of a non-limiting example of decoding order of an SVC video stream in accordance with the present invention, in the case of open-loop coding such as that of FIG. 4.
Figure 11:
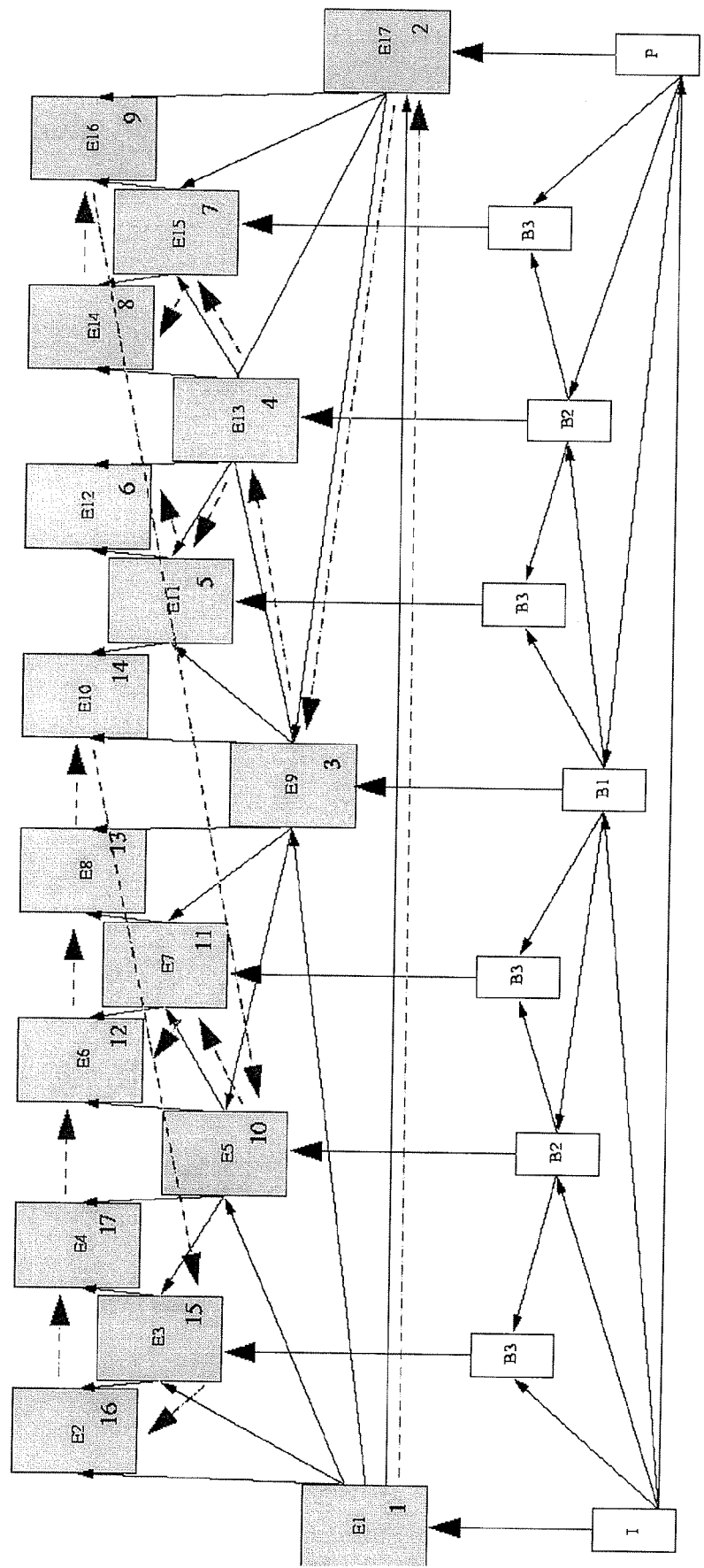
FIG. 11 is a diagrammatic representation of a non-limiting example of decoding order of an SVC video stream in accordance with the present invention, in the case of closed-loop coding such as that of FIG. 5.

FIGS. 10 and 11 present examples of implementation of the invention.

For each of the Figures, the base level is coded with B-hierarchical images. The refinement level doubles the time frequency and increases the spatial resolution. However, this example is in no way limiting. There could equally well be envisaged a refinement level having a time frequency F times greater than that of the base level, F being an integer greater than 2.

In the example of FIG. 10, the refinement level is coded with MCTF. The images Hx are high frequency images and the images Lx are low frequency images. The images illustrated in continuous lines are written in the bitstream. The other images are temporary images generated during decoding. The arrows in continuous line represent the inter-image dependencies, either created by the MCTF, or created by the scalability inter-level prediction. The arrows in dashed line represent a decoding path, i.e. the decoding order obtained by applying the method according to the invention.

Thus, as FIG. 10 shows, in a first phase the images 1 to 6 are decoded. A motion analysis is then carried out. This analysis indicates that it is preferable to continue the decoding with the images 9, 10 and 11. It is then necessary to decode the images 7 and 8. A second motion analysis is then carried out, and it indicates that it is preferable to decode the images 14, 15 and 16. It is then necessary to decode the images 12 and 13. The following image analysis incites continuation of the decoding with images 17 and 18, and so forth.

FIG. 11 shows an example of implementation of the invention for a refinement level coded in B-hierarchical images. The images Ex are B-hierarchical coded refinement images.

As shown by the arrows in dashed line, which also indicate the decoding path, the decoding commences with images 1, 2 et 3. Successive image analyses indicate that the decoding must continue by images 4, then 5 and 6, and 7, 8 and 9. Next the decoding resumes on the left part of the GOP with image 10, and so forth.

Figure 12:
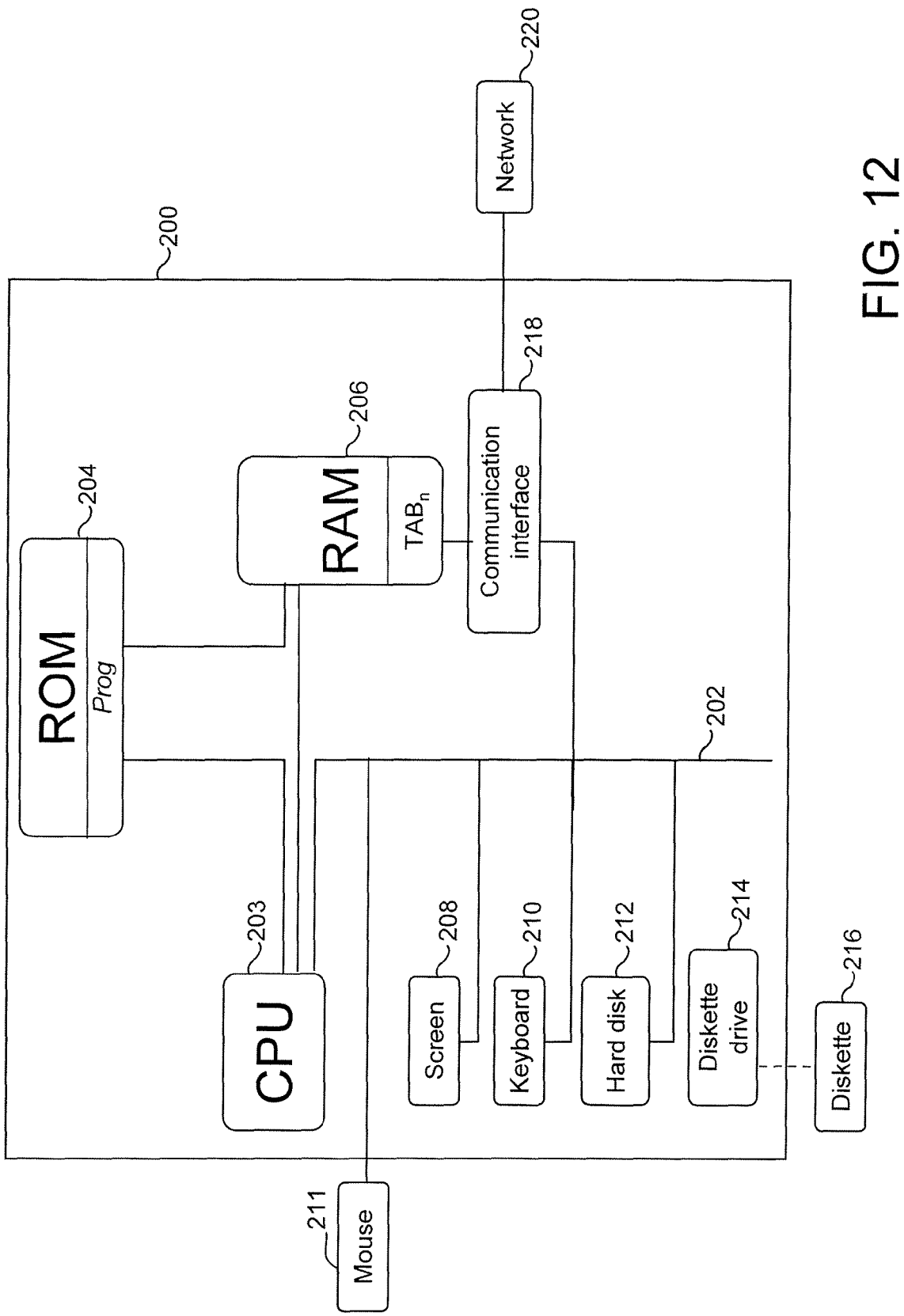
FIG. 12 is a diagrammatic representation of a multimedia unit which may implement the present invention, in a particular embodiment.

A device which may implement the present invention is illustrated in FIG. 12 in the form of a multimedia unit 200.

The multimedia unit may for example be a microcomputer or a workstation. This device is connected to different peripherals such as any means for image storage connected to a graphics card and supplying multimedia data to device 200.

The device 200 comprises a communication bus 202 to which there are connected:
a calculation unit 203,
a read only memory 204, able to contain one or several programs "Prog" executing the decoding method according to the invention,
a random access memory 206, comprising registers adapted to record variables and parameters created and modified during the execution of the aforementioned programs, and in particular the tables $TAB_n$ described above,
a display unit such as a screen 208, for viewing data and/or serving as a graphical interface with a network administrator who will be able to interact with the programs according to the invention, using a keyboard 210 or any other means such as a pointing device, for example a mouse 211 or an optical stylus,
a communication interface 218 connected to a communication network 220, for example the Internet network, the interface being able among others to receive data, in this case, a video stream and in particular, a video stream in SVC format.

The device 200 may also optionally comprise:
a hard disk 212 able to contain the aforementioned programs "Prog",
a diskette drive 214 adapted to receive a diskette 216 and to read or write thereon data processed or to be processed according to the present invention.

The communication bus 202 allows communication and interoperability between the different elements included in the device 200 or connected to it. The representation of the bus is non-limiting and, in particular, the calculation unit 203 unit may communicate instructions to any element of the device 200 directly or by means of another element of the device 200.

The executable code of each program enabling the device 200 to implement the decoding method according to the invention may be stored, for example, on the hard disk 212 or in read only memory 204.

As a variant, the diskette 216 may contain data as well as the executable code of the aforementioned programs which, once read by the device 200, will be stored on the hard disk 212.

In another variant, the executable code of the programs can be received over the communication network 220, via the interface 218, in order to be stored in a manner identical to that described previously.

The diskettes can be replaced by any information carrier such as a compact disc (CD-ROM) or a memory card. Generally, an information storage means, which can be read by a computer or microprocessor, integrated or not into the device 200, and which may possibly be removable, is adapted to store one or several programs whose execution permits the implementation of the method in accordance with the present invention.

More generally, the program or programs may be loaded into one of the storage means of the device 200 before being executed.

The calculation unit 203 controls and directs the execution of the instructions or portions of software code of the program or programs according to the invention, these instructions being stored on the hard disk 212 or in the read only memory 204 or in the other aforementioned storage elements. On powering up, the program or programs which are stored in a non-volatile memory, for example the hard disk 212 or the read only memory 204, are transferred into the random access memory (RAM) 206, which then contains the executable code of the program or programs according to the invention, as well as registers for storing the variables and parameters necessary for implementation of the invention.

The invention claimed is:

1. A method of decoding a scalable video stream, in which the images may be decoded by groups of several images, each group being constituted by at least three levels of image temporal hierarchy, the images of the lowest level having the lowest time frequency and the images of each following level having a time frequency at least twice that of the images of the preceding level, a temporal hierarchy level being formed by at least one predetermined time interval, a time interval separating two images in that temporal hierarchy level, wherein:

during the decoding of at least one temporal hierarchy level, at least one item of information is obtained including at least an item of information representing the motion in the images of the video stream over at least one time interval of said temporal hierarchy, wherein with respect to the item of information representing the motion of the images of the video stream, a parameter is calculated from the content of the images of the video stream over said one time interval, and an order in the decoding of the images of each group of images is defined as a function of said information obtained.

2. A method according to claim 1, wherein the images are decoded in decreasing order of the value of said information representing the motion.

3. A method according to claim 2, wherein said information is the sum of the norm of all the motion vectors of an image relative to a given time interval.

4. A method according to claim 3, in which an image is constituted by a plurality of macroblocks, wherein if a macroblock does not have a motion vector, a motion vector of maximum amplitude is allocated to that macroblock.

5. A method according to claim 3, in which an image is constituted by a plurality of macroblocks, wherein if a macroblock is predicted from the image having the same temporal reference in a lower spatial scalability level, that macroblock is attributed with the motion vector associated with the reference macroblock in the image of the same temporal reference of the lower spatial scalability level.

6. A method according to claim 3, in which an image is constituted by a plurality of macroblocks, wherein if a macroblock has two motion vectors because it is predicted from a preceding image and a following image, the motion vectors serving for the prediction of the preceding image towards the current image enter into the calculation of the norm representing the motion in the time interval between the preceding image and the current image, and the motion vectors serving for the prediction of the following image towards the current image enter into the calculation of the norm representing the motion in the time interval between the current image and the following image.

7. A method according to claim 3, wherein storage is made in a table of size 2n−1, where n is a strictly positive integer, of all the sums of the norms of the motion vectors relative to a given time interval in the temporal hierarchy level n.

8. A method according to claim 2, wherein the video stream is coded in the SVC format.

9. A non-transitory computer readable medium retrievably storing instructions of a computer program, which when executed by a computer, causes the computer to implement a method according to claim 2.

10. A method according to claim 1, wherein said information is the sum of the norm of all the motion vectors of an image relative to a given time interval.

11. A method according to claim 10, in which an image is constituted by a plurality of macroblocks, wherein if a macroblock does not have a motion vector, a motion vector of maximum amplitude is allocated to that macroblock.

12. A method according to claim 10, in which an image is constituted by a plurality of macroblocks, wherein if a macroblock is predicted from the image having the same temporal reference in a lower spatial scalability level, that macroblock is attributed with the motion vector associated with the reference macroblock in the image of the same temporal reference of the lower spatial scalability level.

13. A method according to claim 10, in which an image is constituted by a plurality of macroblocks, wherein if a macroblock has two motion vectors because it is predicted from a preceding image and a following image, the motion vectors serving for the prediction of the preceding image towards the current image enter into the calculation of the norm representing the motion in the time interval between the preceding image and the current image, and the motion vectors serving for the prediction of the following image towards the current image enter into the calculation of the norm representing the motion in the time interval between the current image and the following image.

14. A method according to claim 10, wherein storage is made in a table of size 2n−1, where n is a strictly positive integer, of all the sums of the norms of the motion vectors relative to a given time interval in the temporal hierarchy level n.

15. A method according to claim 1, wherein the video stream is coded in the SVC format.

16. A non-transitory computer readable medium retrievably storing instructions of a computer program, which when executed by a computer, causes the computer to implement a method according to claim 1.

17. A device for decoding a scalable video stream, in which the images may be decoded by groups of several images, each group being constituted by at least three levels of image temporal hierarchy, the images of the lowest level having the lowest time frequency and the images of each following level having a time frequency at least twice that of the images of the preceding level, a temporal hierarchy level being formed by at least one predetermined time interval, a time interval separating two images in that temporal hierarchy level, comprising:

a calculation unit configured to execute stored instructions; and a storage unit configured to store executable instructions for execution by the calculation unit;

wherein the instructions stored by the storage unit cause the calculation unit to execute (a) an obtaining step, during the decoding of at least one temporal hierarchy level, of obtaining at least one item of information representing the motion in the images of the video stream over at least one time interval of said temporal hierarchy, wherein with respect to the item of information representing the motion of the images of the video stream, a parameter is calculated from the content of the images of the video stream over said one time interval, and (b) an ordering step to define an order in the decoding of the images of each group of images as a function of said information obtained.

18. A device according to claim 17, wherein the instructions stored by the storage unit further cause the calculation unit to execute a decoding step configured to decode the images in decreasing order of the value of said information representing the motion.

19. A device according to claim 17, wherein said information is the sum of the norm of all the motion vectors of an image relative to a given time interval.

20. A device according to claim 19, in which an image is constituted by a plurality of macroblocks, wherein the instructions stored by the storage unit further cause the calculation unit to execute an attribution step for attributing a motion vector of maximum amplitude to a macroblock, if that macroblock does not have a motion vector.

21. A device according to claim 19, in which an image is constituted by a plurality of macroblocks, wherein the instructions stored by the storage unit further cause the calculation unit to execute an attribution step for attributing to a macroblock the motion vector associated with the reference macroblock in the image of the same temporal reference of the lower spatial scalability level, if that macroblock is predicted from the image having the same temporal reference in a lower spatial scalability level.

22. A device according to claim 19, in which an image is constituted by a plurality of macroblocks, wherein if a macroblock has two motion vectors because it is predicted from a preceding image and a following image, the motion vectors serving for the prediction of the preceding image towards the current image enter into the calculation of the norm representing the motion in the time interval between the preceding image and the current image, and the motion vectors serving for the prediction of the following image towards the current image enter into the calculation of the norm representing the motion in the time interval between the current image and the following image.

23. A device according to claim 19, wherein the storage unit further stores, in a table of size 2n−1, where n is a strictly positive integer, all the sums of the norms of the motion vectors relative to a given time interval in the temporal hierarchy level n.

24. A device according to claim 19, wherein the video stream is coded in the SVC format.

25. A device according to claim 17, wherein the video stream is coded in the SVC format.

* * * * *